C. SJÖGREN.
VEHICLE WHEEL.
APPLICATION FILED NOV. 23, 1912.
1,059,401.
Patented Apr. 22, 1913.
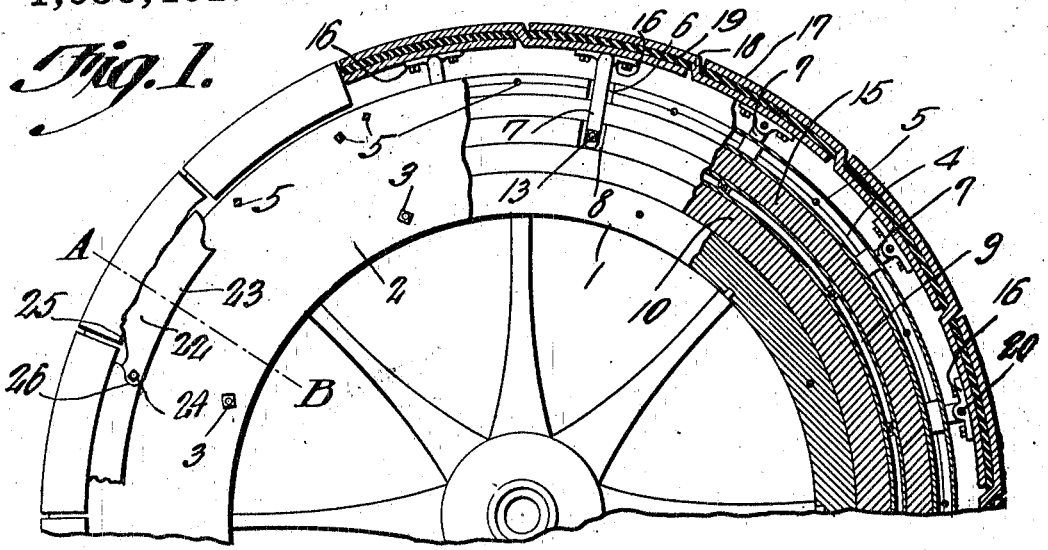
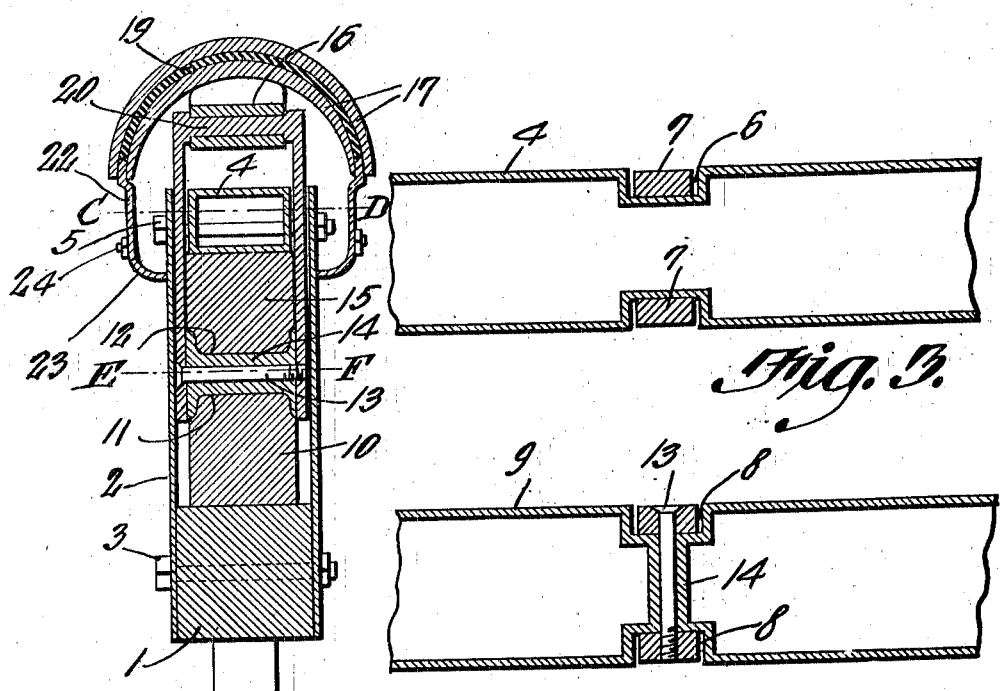
Charl Sjögren, Inventor

UNITED STATES PATENT OFFICE.

CHARL SJÖGREN, OF WESSINGTON SPRINGS, SOUTH DAKOTA.

VEHICLE-WHEEL.

1,059,401.  Specification of Letters Patent.  Patented Apr. 22, 1913.

Application filed November 23, 1912. Serial No. 733,224.

*To all whom it may concern:*

Be it known that I, CHARL SJÖGREN, a citizen of the United States, residing at Wessington Springs, in the county of Jerauld and State of South Dakota, have invented a new and useful Vehicle-Wheel, of which the following is a specification.

This invention relates to vehicle wheels and more particularly to a novel form of tire combined therewith, the tire being made up of metallic and rubber portions so assembled and constructed as to produce an efficient cushioning action, the tire being strong and durable and protected from material injury by contact with stones and other unyielding substances.

Another object is to provide a tire, the parts of which can be assembled readily and will not easily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a view partly in side elevation and partly in section of a portion of a wheel having the present improvements combined therewith. Fig. 2 is a section on line A—B Fig. 1. Fig. 3 is an enlarged section through a portion of the tire, said section being taken on the line C—D Fig. 2. Fig. 4 is a section through the inner ring of the tire, said section being taken on the line E—F Fig. 2.

Referring to the figures by characters of reference 1 designates the rim of the wheel, the same being provided, upon both sides, with retaining rings 2 each of which is preferably formed of a flat strip secured to the rim preferably by means of bolts 3 which extend transversely through both of the rings 2.

Interposed between the peripheral portions of the retaining rings 2 is a tubular metallic outer ring 4 preferably rectangular in cross sectional contour, this outer ring being secured fixedly to the retaining rings 2 by transversely extending bolts 5. Formed in the sides of the outer ring 4 at points midway between the bolts 5, are transverse depressions 6 within which arms 7 are mounted to move freely. These arms are arranged radially and are seated at their inner ends within recesses 8 formed in the sides of the inner metallic ring 9 of the tire. This ring 9 is preferably tubular and rectangular in cross sectional contour, said ring extending entirely around the wheel and being spaced from the rim 1 by an inner cushioning ring 10 of rubber which completely fills the space between the ring 9 and the rim 1. As shown in Fig. 2, this ring 9 is preferably formed with channels within its inner and outer faces, as shown at 11 and 12, the cushioning ring 10 projecting into the inner channel 11 so as thus to be held against lateral displacement relative to the inner ring 9. The arms 7 are secured to the ring 9 by bolts 13 extending transversely through the ring, said ring being preferably reinforced at the points where the bolts are received, as by extending sleeves 14 transversely within the ring and through which the bolts 13 project. These sleeves are preferably integral with the ring as shown in Fig. 4.

Interposed between the outer metallic ring 4 and the inner ring 9 is an outer cushioning ring 15 of rubber or the like, this ring being engaged within the outer channel 12 in the ring 9. As the ring 4 is fixedly connected to the rim 1 by the retaining rings 2, it will be apparent that it thus becomes impossible for the ring 9 to shift inwardly or outwardly without compressing portions of one or the other of the cushioning rings 10 and 15.

The arms 7, as hereinbefore stated, are adapted to move freely within the recesses formed in the outer metallic ring 4. The outer ends of the arms 7 are pivotally connected to brackets 16. These brackets 16 are secured in any suitable manner to the tread plates of the tire. Each of these tread plates which has been indicated at 17, is bowed transversely, as shown in Fig. 2, and is also curved longitudinally so as to lie normally concentric with the axis of the wheel. Each tread plate has one half thereof offset transversely relative to the other half so as thus to form a transverse shoulder 18 at the center thereof. The brackets 16 are attached to the middle portions of the inner halves of the tread plates, each of said inner halves being lapped by the outer halves of the next adjoining plates. A filling, 19, preferably of rubber, is interposed between the lapped portions of the plates, as shown.

As will be noted particularly by referring to Fig. 2, the arms 7 of each pair are preferably formed integral with a cross pin 20 which extends through and is adapted to rotate within one of the brackets 16.

Segmental guard plates 22 are located upon the outer sides of rings 2 and their outer edges project between the lapping portions of the tread plates while their inner edges are curved inwardly so as to contact lightly within the retaining rings 2, as shown at 23. Each of the guard plates 22 is attached at its ends to the adjacent plates 22 by means of bolts 24 and, as shown in Fig. 1, the ends of the guard plates are so shaped as to interfit snugly, one end of each guard plate being provided with a rounded recess 25 while the near end of the next adjoining plate has a rounded tongue 26 adapted to project into the recess.

It will be noted that, by connecting the tread plates to the inner ring 9 by means of the radial arms 7, said tread plates are held spaced from the outer ring 4 so that the air filling the space between the tread plates and the outer ring will prevent the outer ring and the rubber contacting therewith, from becoming heated as a result of the frictional engagement of the tread plates with the surface of the road.

Whenever one or more of the tread plates is forced inwardly toward the center of the wheel, the arms 7 connected to said plates push inwardly on the inner ring 9, thus causing said ring to compress a portion of the cushioning ring 10. At the same time that portion of ring 9 diametrically opposite the point where the said plates are pushed inwardly, will press outwardly against the outer cushioning ring 15 so as to force it against the outer metallic ring 4. Thus a double cushioning action is produced.

As the guard plates 22 extend between the tread plates, it will be seen that they serve to prevent mud, etc., from working between the tread plates and the retaining plates 2 and thus getting into the space between the arms 7.

It will be noted that the various parts of the tire can be readily removed and others substituted therefor.

What is claimed is:—

1. The combination with a wheel rim, of an outer non-flexible ring fixedly connected to but spaced from the rim, an inner non-flexible ring movably mounted between the first named ring and the rim, cushioning means acting on the inner ring, a sectional tread, arms connecting the sections to the inner ring, said arms passing loosely past the outer ring, the sections of the tread being disposed in lapped relation, and interfitting guard plates projecting between the lapping portions of the tread sections.

2. The combination with a wheel rim, of retaining rings secured to the sides of the rim and extending therebeyond, an outer non-flexible ring interposed between and secured to the outer edge portions of the retaining rings, an inner non-flexible ring movably mounted between the rim and the outer ring, cushioning devices interposed between the inner ring and the rim and the outer ring respectively, a sectional tread, arms connecting the sections to the inner ring, said arms extending loosely past the outer ring, the sections of the tread being disposed in lapped relation, and interfitting guard plates mounted on the retaining rings and projecting between the lapping portions of the tread sections.

3. The combination with a wheel rim, of retaining rings secured to the sides thereof, an outer non-flexible ring interposed between and secured to the outer edge portions of the retaining rings, an inner non-flexible ring interposed between the outer ring and the rim, cushioning rings interposed between the inner ring and the rim and the outer ring respectively, said inner ring having channels in its inner and outer faces constituting seats for the cushioning rings, a tread consisting of lapping sections curved transversely and longitudinally, each section having a transverse shoulder adjacent its center and constituting an abutment for the next adjoining section, and arms connecting each section to the inner ring, said arms extending loosely past the outer ring.

4. The combination with a wheel rim, of retaining rings secured to the sides thereof, an outer non-flexible ring interposed between and secured to the outer edge portions of the retaining rings, an inner non-flexible ring interposed between the outer ring and the rim, cushioning rings interposed between the inner ring and the rim and the outer ring respectively, said inner ring having channels in its inner and outer faces constituting seats for the cushioning rings, a tread consisting of lapping sections curved transversely and longitudinally, each section having a transverse shoulder adjacent its center and constituting an abutment for the next adjoining section, arms connecting each section to the inner ring, said arms extending loosely past the outer ring, guard plates having interfitting ends and mounted on the retaining plates, said plates projecting between the lapping portions of the tread plates, and a rubber filling interposed between the lapping portions of the tread sections.

In testimony that I claim the foregoing as my own, I have hereto affixed my signature in the presence of two witnesses.

CHARL SJÖGREN.

Witnesses:
CHAS. R. HATCH,
F. HUNTER.

Copies of this patent may be obtained for five cents each, by addressing the "Commissioner of Patents, Washington, D. C."